US012752757B2

(12) United States Patent
Querbach

(10) Patent No.: US 12,752,757 B2
(45) Date of Patent: Oct. 6, 2026

(54) METHOD FOR CONTROLLING BRAKING PROCESSES OF A BRAKE-BY-WIRE BRAKING SYSTEM, AND BRAKE-BY-WIRE BRAKING SYSTEM

(71) Applicant: ZF Active Safety GmbH, Koblenz (DE)

(72) Inventor: Fabian Querbach, Lonnig (DE)

(73) Assignee: ZF Active Safety GmbH, Koblenz (DE)

( * ) Notice: Subject to any disclaimer, the term of this patent is extended or adjusted under 35 U.S.C. 154(b) by 78 days.

(21) Appl. No.: 18/818,986

(22) Filed: Aug. 29, 2024

(65) Prior Publication Data

US 2026/0061981 A1 Mar. 5, 2026

(30) Foreign Application Priority Data

Jul. 3, 2023 (DE) ......................... 102023117545.9

(51) Int. Cl.
*B60T 13/66* (2006.01)
*B60T 13/74* (2006.01)

(52) U.S. Cl.
CPC .......... *B60T 13/662* (2013.01); *B60T 13/741* (2013.01); *B60T 2270/82* (2013.01)

(58) Field of Classification Search
CPC ... B60T 13/662; B60T 13/741; B60T 2270/82
See application file for complete search history.

(56) References Cited

U.S. PATENT DOCUMENTS 9,623,851 B1 * 4/2017 Cymbal ................ B60T 8/1766
2011/0221265 A1 * 9/2011 Busack ............... B60T 8/17616 303/152
2015/0094925 A1 * 4/2015 Senoo ..................... B60T 1/005 701/70
2018/0029577 A1 * 2/2018 Beauvais ................ B60T 8/176
2019/0331221 A1 * 10/2019 Shirakawa .............. B60T 11/10
(Continued)

FOREIGN PATENT DOCUMENTS

DE 19703688 A1 8/1998
DE 60317277 T2 8/2008
(Continued)

*Primary Examiner* — Long T Tran
(74) *Attorney, Agent, or Firm* — Kristin L. Murphy

(57) ABSTRACT

A method for controlling braking processes of a motor vehicle by a brake-by-wire braking system is described. Each front wheel and each rear wheel of a motor vehicle has an individually controllable braking actuator for achieving different braking forces. The braking actuators are controlled via the brake-by-wire braking system. The method begins with the following step: when the vehicle speed corresponds to that of a first specified threshold value or is greater than this threshold value, braking forces are set at the front wheel brakes and rear wheel brakes, wherein the set braking forces of the front wheel brakes are higher than those of the rear wheel brakes. In a second step, when the vehicle speed undershoots that of the first specified threshold value, the braking forces at the rear wheel brakes are increased in comparison with the braking forces thereof in the first step, and the braking forces at the front wheel brakes are reduced in comparison with the braking forces thereof in the first step.

12 Claims, 2 Drawing Sheets

(56) References Cited

U.S. PATENT DOCUMENTS

| | | | | |
|---|---|---|---|---|
| 2020/0070833 | A1* | 3/2020 | Suzuki | B62D 11/24 |
| 2021/0221231 | A1* | 7/2021 | Maruyama | B60L 7/18 |
| 2022/0105809 | A1* | 4/2022 | Yamamoto | B60L 15/2036 |
| 2022/0194336 | A1* | 6/2022 | Yamamoto | B60T 8/266 |
| 2022/0314812 | A1* | 10/2022 | Yamamoto | B60T 13/586 |
| 2023/0174036 | A1* | 6/2023 | Saotome | B60T 8/17616<br>701/78 |
| 2023/0347748 | A1* | 11/2023 | Kurosawa | B60W 20/14 |
| 2024/0132150 | A1* | 4/2024 | Marx | B60W 30/02 |

FOREIGN PATENT DOCUMENTS

| | | | |
|---|---|---|---|
| DE | 102011076980 | A1 | 12/2012 |
| DE | 102014200435 | A1 | 7/2015 |
| DE | 112020002561 | T5 | 2/2022 |
| DE | 102021130887 | A1 | 6/2022 |
| DE | 112021000579 | T5 | 12/2022 |
| DE | 102021133873 | A1 | 6/2023 |
| DE | 11202201460 | T5 | 12/2023 |
| WO | 2022249835 | A1 | 12/2022 |

* cited by examiner

METHOD FOR CONTROLLING BRAKING PROCESSES OF A BRAKE-BY-WIRE BRAKING SYSTEM, AND BRAKE-BY-WIRE BRAKING SYSTEM

CROSS-REFERENCE TO RELATED APPLICATIONS

This application claims priority to German Application No. 102023117545.9 filed on Jul. 3, 2024, the disclosure of which is hereby incorporated in its entirety by reference herein.

TECHNICAL FIELD

The disclosure relates to a method for controlling braking processes of a motor vehicle by a brake-by-wire braking system. The disclosure furthermore relates to a brake-by-wire braking system.

BACKGROUND

In brake-by-wire braking systems, each individual wheel is assigned a braking actuator unit having an electromechanical braking actuator.

In such systems, the actuation of the brake pedal is electronically interrogated in order to detect a braking intention of the driver. On the basis of these data, the individual braking actuators are then controlled by one or more electronic control units. There is no mechanical connection between the brake pedal and the braking actuators.

The normal practice in modern hydraulic brake-by-wire braking systems is to control the brakes of the individual wheels by a central actuator, such that only the total braking force expended is adapted by the braking signal.

In the case of a standard brake, the braking force at the front wheel brakes is higher than the braking force at the rear wheel brakes in order to stabilize the motor vehicle and maximize deceleration. As a result, the vehicle compresses the front shock absorbers as it brakes, and this may be perceived as troublesome by the occupants.

What is needed is to provide a method for controlling braking processes by a brake-by-wire braking system, which method improves the comfort of the occupants during the braking processes. In addition, what is needed is to provide a brake-by-wire braking system which can implement this method.

SUMMARY

According to the disclosure, a method for controlling braking processes of a motor vehicle by means of a brake-by-wire braking system, wherein each front wheel and each rear wheel of the motor vehicle has an individually controllable braking actuator for achieving different braking forces, and wherein the braking actuators are controlled via the brake-by-wire braking system. The method comprises the following steps:

When the vehicle speed corresponds to that of a first specified threshold value or is greater than this threshold value, braking forces are set at front wheel brakes and rear wheel brakes. The set braking forces of the front wheel brakes are higher than those of the rear wheel brakes.

In a second step, when the vehicle speed undershoots that of the first specified threshold value, the braking forces at the rear wheel brakes are increased in comparison with the braking forces thereof in the step above, and the braking forces at the front wheel brakes are reduced in comparison with the braking forces thereof.

In other words, the braking forces are shifted more to the rear wheels just before the vehicle comes to a halt. By virtue of this shifting of the braking forces, the vehicle compresses the front shock absorbers less as it stops, and this is perceived as being more pleasant by the occupants. Therefore, the braking processes make it more pleasant for the occupants by redistributing the braking forces after an initial reduction of the speed, such that the majority of the braking forces is present at the rear wheel brakes. Thus, before the vehicle speed undershoots the first specified threshold value, a standard braking process is carried out. After the first specified threshold value is undershot, the vehicle speed is low enough to ensure that instability of the vehicle no longer occurs, even on account of higher braking forces at the rear wheel brakes. The disclosure relates to a normal braking process without the intervention of an ABS or ESP or other safety system, in which the vehicle is stabilized by short-duration pulsing of the braking force in order to prevent an accident.

According to one exemplary arrangement of the method, when the vehicle speed undershoots a second specified threshold value, which is less than the first threshold value, the braking forces at the front wheel brakes are increased in comparison with the braking forces thereof in the second step.

According to another exemplary arrangement of the method, when the vehicle speed undershoots a third specified threshold value, which is less than the first threshold value, the braking forces at the rear wheel brakes are reduced in comparison with the braking forces thereof in the second step.

This increase or reduction of the braking forces provides more uniform braking force distribution for final stopping, and therefore the vehicle stops uniformly. As a result, the comfort of the occupants is increased since there is no longer higher compression at the front shock absorbers.

According to one exemplary arrangement, the third specified threshold value is less than or equal to the second specified threshold value. This ensures that the total effective braking force is not accidentally reduced during the braking process. Consequently, it is also ensured that the vehicle is braked or comes to a halt in a timely fashion and as intended by the driver.

According to another concept, when the first specified threshold value is undershot, the braking forces up to the end of the braking process are set higher at the rear wheel brakes than the braking forces at the front wheel brakes. This too reduces higher compression at the front shock absorbers in comparison with the rear shock absorbers and consequently increases the comfort of the occupants.

In the case of braking processes on a bend, when the vehicle speed undershoots the first specified threshold value and the braking forces are increased at the rear wheel brakes and reduced at the front wheel brakes in accordance with the second step, the braking force can be increased more at the rear wheel brake on the inside of the bend than at the rear wheel brake on the outside of the bend, and/or the braking force can be reduced more at the front wheel brake on the outside of the bend than the braking force at the front wheel brake on the inside of the bend. This speed-dependent dynamic adaptation of the braking forces leads to more rapid turning in of the vehicle, and therefore the braking process makes cornering easier. The different braking forces consequently assist cornering.

According to one exemplary arrangement, in the case of braking processes during reversing, the braking force ratios are reversed in that, in the first step, the braking forces at the rear wheel brakes are set higher than the braking forces at the front wheel brakes, while, in the second step, when the threshold value is undershot, the braking forces are reduced at the rear wheel brakes and increased at the front wheel brakes. By this means too, the comfort of the occupants is increased since higher compression at the rear shock absorbers of the vehicle no longer occurs.

According to the disclosure, a brake-by-wire braking system for a motor vehicle, having a controller and a braking actuator for each wheel of the motor vehicle is also disclosed. This is, in one exemplary arrangement, an electromechanical braking actuator or an electrohydraulic braking actuator for each wheel of the motor vehicle. The controller of the brake-by-wire braking system is configured to carry out an above-described method for braking processes of the motor vehicle, wherein each of the braking actuators can be triggered separately by a signal from the controller. The brake-by-wire braking system thus allows speed-dependent and/or speed-dependent dynamic braking force adaptation, thereby increasing the comfort of the occupants.

BRIEF DESCRIPTION OF THE DRAWINGS

Further advantages and features of the disclosure will become apparent from the following description and from the appended drawings, to which reference is made. In the drawings.

DETAILED DESCRIPTION

Figure 1:
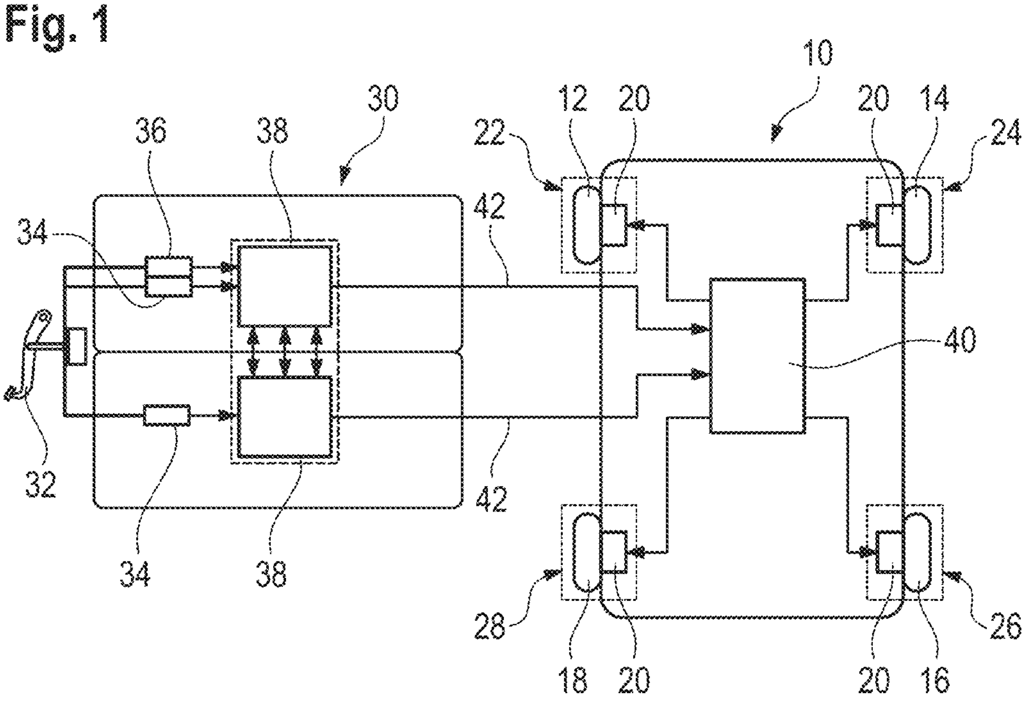
FIG. 1 shows a schematic illustration of an exemplary arrangement of a braking system according to the disclosure.

FIG. 1 illustrates schematically a brake-by-wire braking system 10 for a vehicle (not shown) with four brakeable wheels 12, 14, 16, 18. For example, the vehicle has two front wheels 12, 14 and two rear wheels 16, 18.

Each of the wheels 12, 14, 16, 18 is assigned a dedicated braking actuator 20. In each case, the braking actuator 20 can be an electromechanical braking actuator or an electrohydraulic braking actuator.

Due to the braking actuator 20, it is possible, for example, in each case for a brake pad assigned to a wheel 12, 14, 16, 18 to be moved and pressed against a brake disc in order to brake the vehicle. Thus, the braking actuators 20, the brake pads and the brakes respectively form two front wheel brakes 22, 24 and two rear wheel brakes 26, 28.

The brake-by-wire braking system 10 furthermore comprises a brake actuating unit 30 for actuation by the driver for a braking operation.

The brake actuating unit 30 has a brake pedal 32, which can be actuated by the driver's foot.

In addition, the brake actuating unit 30 comprises one or more sensors 34 for detecting a deflection of the brake pedal 32, and a force sensor 36 for detecting a braking force when the brake actuating unit 30 is activated by the driver. In other words, the sensors 34, 36 serve to detect the braking intention of the driver, which the latter indicates by actuating the brake pedal 32.

The brake actuating unit 30 furthermore has two signal conditioning units 38, which are each assigned to one of the sensors 34. One of the two signal conditioning units 38 is additionally assigned to the force sensor 36.

In addition, the brake-by-wire braking system 10 also has a controller 40, which is configured to control the braking actuators 20 in order to generate a braking force on one of the associated wheels 12, 14, 16, 18.

For this purpose, the signal conditioning unit 38 is connected in terms of signals to the controller 40, for example, via the signal line 42. Thus, the controller 40 is configured to further process a signal output by the associated signal conditioning unit 38. In particular, the controller 40 can in each case control one or more of the front and rear wheel brakes 22, 24, 26, 28 or the braking actuators 20 thereof in order to exert a braking force on the respective associated wheel 12, 14, 16, 18.

Figure 2:
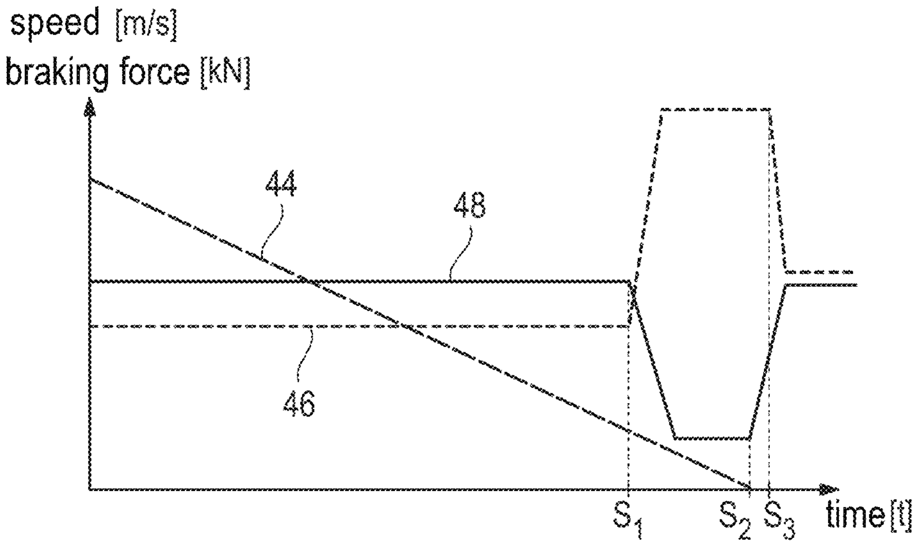
FIG. 2 shows a profile of an exemplary arrangement of a speed-dependent braking force distribution according to the disclosure for a braking process.

A braking process with speed-dependent braking force distribution according to the disclosure using the brake-by-wire braking system 10 is illustrated in FIG. 2.

FIG. 2 shows a diagram in which a distance in metres travelled by the vehicle against the time in seconds and the effective braking forces in kilonewtons against the time in seconds are plotted.

The detected vehicle speed is illustrated by the curve 44. The braking forces acting at the rear wheel brakes 26, 28 are illustrated by braking force curve 46, and the braking forces acting at the front wheel brakes 22, 24 are illustrated by braking force curve 48.

In the scenario illustrated in FIG. 2, a "standard braking process" is being carried out at the beginning. In this case, the braking forces acting at the front wheel brakes 22, 24 are higher than the braking forces acting at the rear wheel brakes 26, 28.

The braking process is started when the driver actuates the brake pedal 32, and the vehicle speed begins to decrease.

Figure 3:
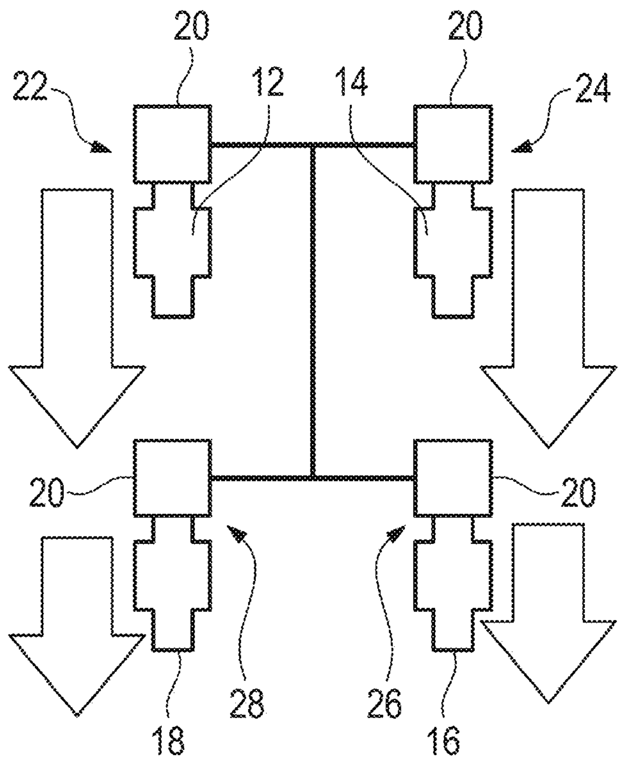
FIG. 3 shows a schematic illustration of the braking force distribution according to a first step of the braking process.

FIG. 3 shows the braking force distribution in a standard braking process in the case of straight-ahead travel. It is clear from this schematic illustration that, after the actuation of the brake pedal 32, higher braking forces are set by the controller 40 at the front wheel brakes 22, 24 than at the rear wheel brakes 26, 28, this being symbolized by longer arrows.

This braking force distribution is maintained for as long as the vehicle speed is equal to or greater than a first specified threshold value $s_1$ (see FIG. 2).

When the vehicle speed undershoots the first specified threshold value $s_1$, the controller 40 changes the braking force distribution. To be more precise, the controller 40 increases the braking forces at the rear wheel brakes 26, 28 in comparison with the braking forces thereof at vehicle speeds above the first specified threshold value $s_1$, and reduces the braking forces at the front wheel brakes 22, 24 in comparison with the braking forces thereof before the vehicle speed undershoots the first specified threshold value $s_1$.

In the braking force profile illustrated in FIG. 2, the braking forces of the rear wheel brakes 26, 28 are changed more in comparison with the braking forces of the front wheel brakes 22, 24.

These changes in the braking forces are such that the braking forces at the rear wheel brakes 26, 28 are higher, by as much as a factor of 3, than those at the front wheel brakes 22, 24.

It can also be seen that, when the vehicle speed undershoots a second specified threshold value $s_2$, the braking forces are increased again at the front wheel brakes 22, 24. For example, the braking forces at the front wheel brakes 22, 24 are raised to the level which they had at the beginning of the braking process, i.e. before the first specified threshold value $s_1$ was undershot.

If the vehicle speed decreases further, the braking forces at the rear wheel brakes 26, 28 are reduced by the controller 40 if a third specified threshold value $s_3$ is undershot.

In contrast to the increase in the braking forces at the front wheel brakes 22, 24, the braking forces at the rear wheel brakes 26, 28 are not reduced to the braking force level set at the beginning of the braking process. Instead, the braking forces acting at the rear wheel brakes 26, 28 are reduced only to the extent that they remain higher than the braking forces at the front wheel brakes 22, 24.

Thus, from the time when the vehicle speed undershoots the first specified threshold value $s_1$, higher braking forces act at the rear wheel brakes 26, 28 than at the front wheel brakes 22, 24.

In the braking process illustrated here, it is readily apparent that the second specified threshold value $s_2$ and the third specified threshold value $s_3$ are lower than the first specified threshold value $s_1$. However, the third specified threshold value $s_3$ does not necessarily have to be lower than the second specified threshold value $s_2$, as illustrated in FIG. 2. The third specified threshold value $s_3$ can likewise correspond to the second specified threshold value $s_2$.

The braking process shown in FIG. 2 applies to forward travel. Speed-dependent braking force adaptation can likewise be performed by the controller 40 in the case of reversing. For this purpose, the braking force curves 46, 48 are merely swapped. That is to say that braking force curve 46 would represent the braking force at the front wheel brakes 22, 24, and braking force curve 48 would represent the braking force at the rear wheel brakes 26, 28.

Alternatively, to the speed-dependent adaptation of the braking force, it would also be possible for speed-dependent dynamic adaptation of the braking force to be carried out by the controller 40. In this case, the aim is to generate more dynamic behaviour by the vehicle, this being advantageous when cornering, in order to assist the vehicle to steer into the bend by use of the brakes.

Figure 4:
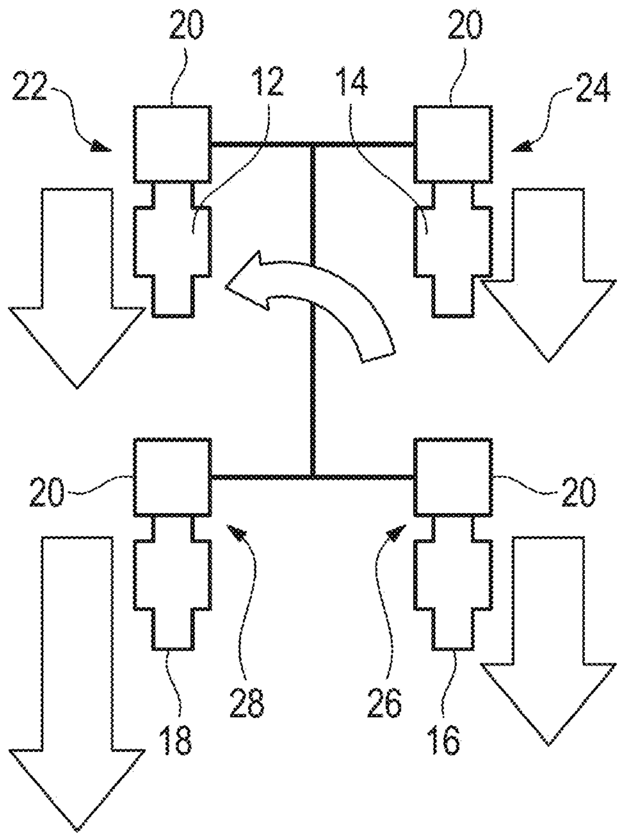
FIG. 4 shows a schematic illustration of an exemplary arrangement of a speed-dependent dynamic braking force distribution during cornering.

FIG. 4 shows a schematic illustration of speed-dependent dynamic braking force distribution. Here, the arrows represent the effective braking forces.

Up to the point when the first specified threshold value $s_1$ is undershot, standard braking, which is shown in FIG. 3, is also performed when cornering. In other words, until the vehicle speed undershoots the first specified threshold value $s_1$, the braking forces acting at the front wheel brakes 22, 24 are higher than the braking forces acting at the rear wheel brakes 26, 28.

When the vehicle speed undershoots the first specified threshold value $s_1$ and the effective braking forces are adapted by the controller 40, the braking force is increased more at the rear wheel brake 28 on the inside of the bend than at the rear wheel brake 26 on the outside of the bend, and the braking force is reduced more at the front wheel brake 24 on the outside of the bend than the braking force at the front wheel brake 22 on the inside of the bend.

In this case, the braking forces acting at the rear wheel brakes 26, 28 can both be higher than the braking forces acting at the front wheel brakes 22, 24. Alternatively, however, the rear wheel brake 26 on the outside of the bend and the front wheel brake 22 on the inside of the bend can be subject to the same braking forces.

What is claimed is:

1. A method for controlling braking processes of a motor vehicle using a brake-by-wire braking system having front wheels and rear wheels, wherein each front wheel and each rear wheel of the motor vehicle has an individually controllable braking actuator for achieving different braking forces, wherein the braking actuators are controlled via the brake-by-wire braking system, the method comprising the following steps:

a) when a vehicle speed corresponds to that of a first specified threshold value or is greater than the first specified threshold value, setting braking forces at front wheel brakes and rear wheel brakes, wherein the set braking forces of the front wheel brakes are higher than those of the rear wheel brakes; and, b) during a normal braking process without intervention of an antilock braking system, an electronic stability program, or other safety system, when the vehicle speed undershoots that of the first specified threshold value, increasing the braking forces at the rear wheel brakes in comparison with the braking forces thereof in step a) and reducing the braking forces at the front wheel brakes in comparison with the braking forces thereof in step a).

2. The method according to claim 1, wherein, when the vehicle speed undershoots a second specified threshold value, which is less than the first threshold value, the braking forces at the front wheel brakes are increased in comparison with the braking forces thereof in step b).

3. The method according to claim 2, wherein, when the vehicle speed undershoots a third specified threshold value, which is less than the first threshold value, the braking forces at the rear wheel brakes are reduced in comparison with the braking forces thereof in step b).

4. The method according to claim 2, wherein when the first specified threshold value is undershot, the braking forces up to the end of the braking process are set higher at the rear wheel brakes than the braking forces at the front wheel brakes.

5. The method according to claim 1, wherein, when the vehicle speed undershoots a third specified threshold value, which is less than the first threshold value, the braking forces at the rear wheel brakes are reduced in comparison with the braking forces thereof in step b).

6. The method according to claim 5, wherein the third specified threshold value is less than or equal to the second specified threshold value.

7. The method according to claim 1, wherein when the first specified threshold value is undershot, the braking forces up to the end of the braking process are set higher at the rear wheel brakes than the braking forces at the front wheel brakes.

8. The method according to claim 1, wherein, in the case of braking processes on a bend, when the vehicle speed undershoots the first specified threshold value and the braking forces are increased at the rear wheel brakes and reduced at the front wheel brakes in accordance with step b), the braking force is increased more at the rear wheel brake on the inside of the bend than at the rear wheel brake on the outside of the bend.

9. The method according to claim 1, wherein during reversing, braking force ratios are reversed in that, in step a), the braking forces at the rear wheel brakes are set higher than the braking forces at the front wheel brakes, while, in step b), when the threshold value is undershot, the braking forces are reduced at the rear wheel brakes and increased at the front wheel brakes.

10. A brake-by-wire braking system for a motor vehicle, having a controller and a braking actuator, for each wheel of the motor vehicle, wherein the controller is configured to carry out a method for braking processes of the motor vehicle according to claim 1, wherein each of the braking actuators can be triggered separately by a signal from the controller.

11. The brake-by-wire system of claim 10, wherein each braking actuator is one of an electromechanical braking actuator and electrohydraulic braking actuator.

12. The method according to claim 1, wherein, in the case of braking processes on a bend, when the vehicle speed undershoots the first specified threshold value and the braking forces are increased at the rear wheel brakes and reduced at the front wheel brakes in accordance with step b), the braking force is reduced more at the front wheel brake on the outside of the bend than the braking force at the front wheel brake on the inside of the bend.

* * * * *